US010024177B2

(12) United States Patent
Brown

(10) Patent No.: US 10,024,177 B2
(45) Date of Patent: Jul. 17, 2018

(54) DETACHABLE FAN BLADE PLATFORM AND METHOD OF REPAIRING SAME

(75) Inventor: Charles W. Brown, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1513 days.

(21) Appl. No.: 13/471,718

(22) Filed: May 15, 2012

(65) Prior Publication Data

US 2013/0309073 A1 Nov. 21, 2013

(51) Int. Cl.

| | |
|---|---|
| ***F01D 5/02*** | (2006.01) |
| ***F01D 5/30*** | (2006.01) |
| ***F01D 11/00*** | (2006.01) |
| *F16J 15/32* | (2016.01) |
| *B23P 6/00* | (2006.01) |

(52) U.S. Cl.

CPC ......... *F01D 5/3053* (2013.01); *F01D 5/3007* (2013.01); *F01D 11/008* (2013.01); *F05D 2230/80* (2013.01); *F05D 2240/80* (2013.01); *Y10T 29/49318* (2015.01)

(58) Field of Classification Search

CPC ........ F01D 5/30; F01D 5/3023; F01D 5/3046; F01D 5/3053; F01D 5/32; F01D 5/323; F01D 11/008

USPC ............. 416/204 R, 219 R, 220 R, 221, 230, 416/241 A, 248; 277/630, 637, 644

See application file for complete search history.

(56) References Cited

U.S. PATENT DOCUMENTS

| | | | | |
|---|---|---|---|---|
| 3,468,212 | A * | 9/1969 | Tinnerman | 411/436 |
| 3,990,814 | A | 11/1976 | Leone | |
| 4,393,650 | A * | 7/1983 | Pool | 60/39.093 |
| 4,872,812 | A | 10/1989 | Hendley et al. | |
| 5,464,326 | A * | 11/1995 | Knott | 416/193 A |
| 5,655,876 | A | 8/1997 | Rock et al. | |
| 5,820,338 | A | 10/1998 | Kasprow et al. | |
| 5,935,360 | A | 8/1999 | Griggs | |
| 5,957,658 | A | 9/1999 | Kasprow et al. | |
| 6,146,099 | A | 11/2000 | Zipps et al. | |

(Continued)

FOREIGN PATENT DOCUMENTS

| | | |
|---|---|---|
| EP | 0787890 B1 | 7/2002 |
| EP | 1067274 B1 | 5/2005 |
| EP | 2213839 | 8/2010 |

OTHER PUBLICATIONS

International Search Report for PCT Application No. PCT/US2013/039432, dated Jul. 23, 2013.

(Continued)

*Primary Examiner* — Jason Shanske
*Assistant Examiner* — Alexander White
(74) *Attorney, Agent, or Firm* — Carlson, Gaskey & Olds, P.C.

(57) ABSTRACT

A fan section for a gas turbine engine includes a hub. A fan blade is secured to the hub. A platform is removably secured to the hub and is arranged adjacent to the fan blade. The platform has a body with lateral sides that each include a channel. A seal is removably received in each of the channels, with one of the seals abutting the fan blade. A method of repairing the fan blade platform includes the steps of removing a nose cone to provide access to a hub, detaching a platform from the hub, and pulling the seal from a groove in the platform.

5 Claims, 2 Drawing Sheets

(56) References Cited

U.S. PATENT DOCUMENTS

| | | | | |
|---|---|---|---|---|
| 6,447,250 | B1 | 9/2002 | Corrigan et al. | |
| 6,447,255 | B1 | 9/2002 | Bagnall et al. | |
| 6,520,742 | B1 | 2/2003 | Forrester et al. | |
| 6,634,863 | B1 * | 10/2003 | Forrester et al. | 416/220 R |
| 6,991,428 | B2 | 1/2006 | Crane | |
| 7,252,477 | B2 * | 8/2007 | Tomita et al. | 416/193 A |
| 7,553,125 | B2 | 6/2009 | Audic et al. | |
| 7,762,781 | B1 * | 7/2010 | Brown et al. | 416/193 A |
| 8,070,438 | B2 | 12/2011 | Evans | |
| 2008/0015986 | A1 | 7/2008 | Evans | |
| 2008/0159866 | A1 | 7/2008 | Evans | |
| 2010/0111700 | A1 | 5/2010 | Kim et al. | |
| 2010/0150724 | A1 * | 6/2010 | Forgue et al. | 416/219 R |
| 2010/0172760 | A1 * | 7/2010 | Ammann | 416/179 |
| 2012/0230829 | A1 | 9/2012 | Benkler et al. | |

OTHER PUBLICATIONS

International Preliminary Report on Patentability for International Application No. PCT/US2013/039432 dated Nov. 27, 2014.
Singapore Search Report for Singapore Patent Application No. 11201407499V dated Apr. 20, 2015.
European Extended Search Report for EP Application No. 13790333.2 dated Feb. 26, 2016.

* cited by examiner

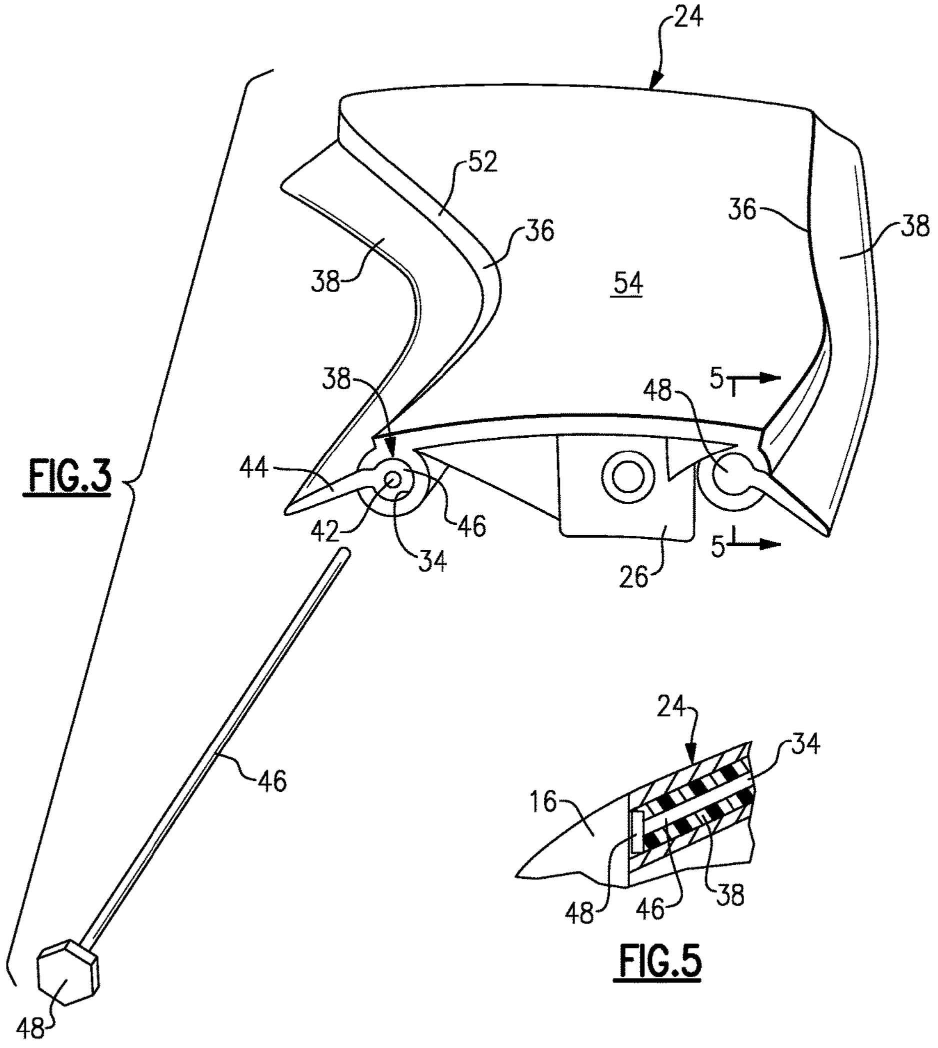
FIG.3
FIG.5
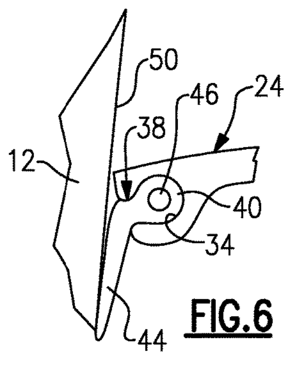
FIG.6
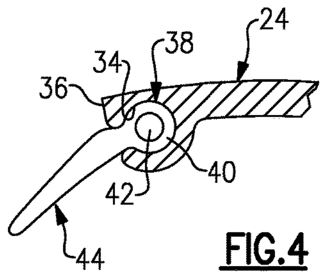
FIG.4

DETACHABLE FAN BLADE PLATFORM AND METHOD OF REPAIRING SAME

BACKGROUND

This disclosure relates to a detachable fan blade platform for a fan section of a gas turbine engine. More particularly, the disclosure relates to a seal arrangement supported by the platform for sealing against adjacent fan blades.

Some fan sections of gas turbine engines utilize fan blades with nonintegral platforms. The platforms are provided by discrete structures arranged between adjoining fan blades. The fan blades and platforms are supported by a fan hub.

In one example arrangement, seals are provided on lateral sides of the platform to seal against the fan blades and provide a sealed inner flowpath. Each of the lateral sides is provided by a relatively flat surface. An L or P-shaped seal is bonded to each of the lateral surfaces with epoxy. A typically platform body is constructed from fiber reinforced composite material and the seals are constructed from fabric reinforced silicone.

The seals must be periodically replaced during engine service, which requires a significant amount of lead time. The seals must be cut or torn from the platform, and the old resin scraped away without damaging the platform. The new seals must then be bonded with an adhesive to each of the lateral sides.

SUMMARY

In one exemplary embodiment, a detachable fan blade platform includes a body having lateral sides each having a channel. A seal is removably received in each of the channels.

In a further embodiment of any of the above, the body is constructed from fiber reinforced composite material.

In a further embodiment of any of the above, the seal is constructed from an elastomer.

In a further embodiment of any of the above, the channels provide C-shape grooves. The seals include a bulb that is received in its respective channel and a flexible wall extends from the bulb and away from the body. The wall is configured to seal against a fan blade surface.

In a further embodiment of any of the above, the bulb includes a hole, and the platform includes a pin that is received in the hole preventing the bulb from collapsing radially inward.

In a further embodiment of any of the above, the pin is plastic.

In a further embodiment of any of the above, the pin includes a head having a diameter larger than that of the hole.

In a further embodiment of any of the above, the body is integral with a portion of the channels and each channel includes another portion that is secured to the body.

In a further embodiment of any of the above, the other portion is secured to the body by thermal or chemical welding.

In a further embodiment of any of the above, the body includes flanges opposite an inner flow path. The brackets include attachment features that are configured to secure the body to a hub.

In another exemplary embodiment, a method of repairing a fan blade platform includes the steps of removing a nose cone to provide access to a fan hub, detaching a platform from the fan hub, and pulling a removable seal from a groove in the platform.

In a further embodiment of any of the above, the removing step includes removing a cap and a spinner.

In a further embodiment of any of the above, the pulling step includes sliding a pin out of the seal and removing the seal from a channel in the platform.

In a further embodiment of any of the above, the method includes the step of installing a new seal in the groove.

In a further embodiment of any of the above, the installing step includes sliding the new seal into the groove.

In a further embodiment of any of the above, the installing step includes sliding the pin into a longitudinal hole in the new seal.

In a further embodiment of any of the above, the installing step includes reattaching the nose cone to the fan hub. The nose cone blocks the pin in an axial direction.

In another exemplary embodiment, a seal for a detachable fan blade platform includes a longitudinally extending elastomeric body that provides a bulb having a longitudinal hole. A flexible wall is integral with and extends from the bulb.

In another exemplary embodiment, a fan section for a gas turbine engine includes a hub. The gas turbine engine includes a fan blade secured to the hub. A platform is removably secured to the hub and adjacent to the fan blade. The platform has a body with lateral sides that each have a channel. A seal is removably received in each of the channels, with one of the seals abutting the fan blade.

In a further embodiment of any of the above, a pin is received in a hole in the seals and a nose cone is secured to the hub and blocks the pin in an axial direction.

BRIEF DESCRIPTION OF THE DRAWINGS

The disclosure can be further understood by reference to the following detailed description when considered in connection with the accompanying drawings wherein:

FIG. 3 is an exploded view of an example platform including removable seals and a pin.

FIG. 4 is an enlarged end view of a portion of the platform shown in FIG. 3.

FIG. 5 is a cross-section through the platform taken along line 5-5 in FIG. 3 with a spinner arranged at a forward end of the platform.

FIG. 6 is a view similar to FIG. 4 but with a fan blade schematically depicted in an installed position.

DETAILED DESCRIPTION

Figure 1:
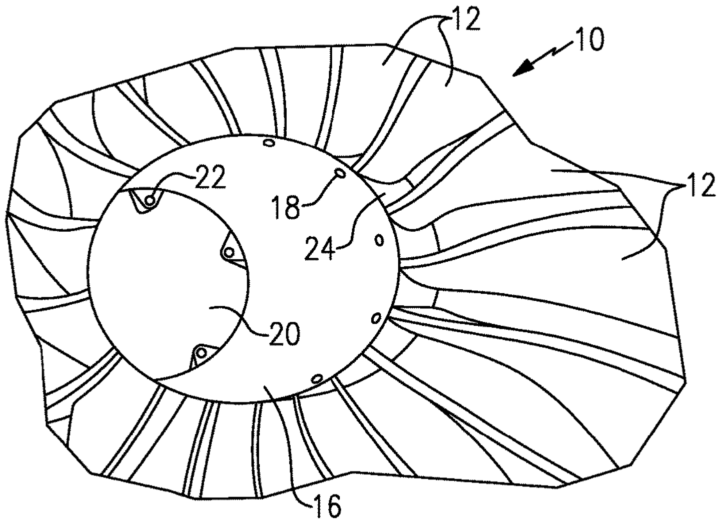
FIG. 1 is a perspective view of a portion of a fan section having fan blades and discrete platforms.
Figure 2:
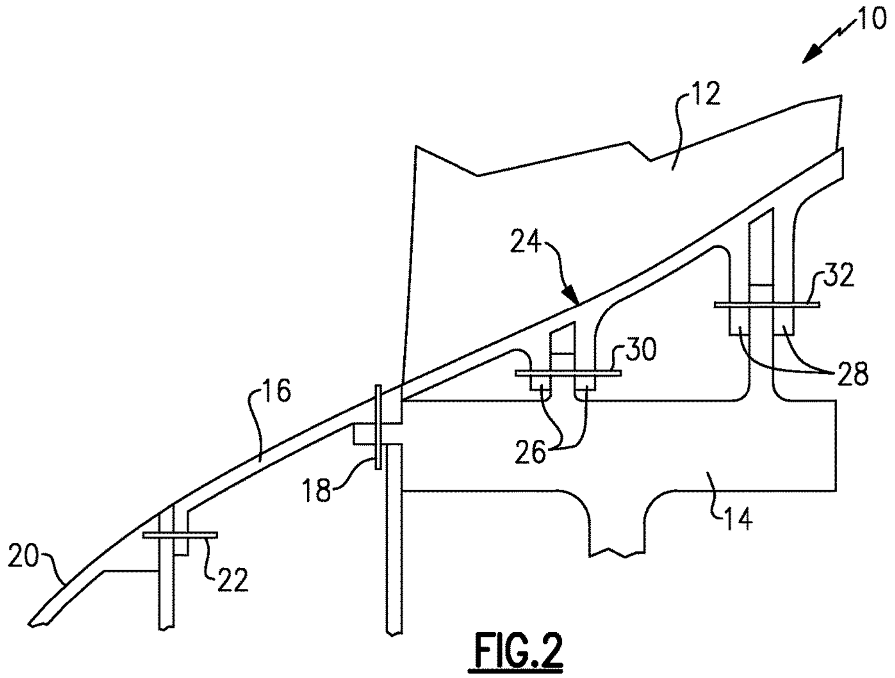
FIG. 2 is a cross-sectional view through a portion of the fan section shown in FIG. 1.

A fan section 10 of a gas turbine engine is schematically depicted in FIG. 1. The fan section 10 includes multiple circumferentially arranged fan blades 12. The fan blades 12 include non-integral, discrete platforms 24 arranged between adjacent fan blades 12. Referring to FIGS. 1 and 2, the fan blades 12 are mounted to a fan hub 14. A nose cone is arranged forward of the fan blades 12 to provide an aerodynamic inner flowpath through the fan section 10. The nose cone is provided by a spinner 16 secured to the fan hub 14 by fasteners 18. A cap 20 is secured to the spinner 16 by fasteners 22.

Referring to FIG. 2, the platform 24 includes first and second flanges 26, 28 secured to corresponding attachment features on the fan hub 14 respectively by fasteners 30, 32. The fasteners 18, 22, 30, 32 are schematically depicted in FIG. 2 by simple, thickened lines for clarity.

Referring to FIGS. 3-5, the platform 24 is provided by a body 54 having lateral sides 36 that each include a channel 34 providing a C-shaped groove. In one example, the grooves may be ¼"-⅜" (6.35-9.53 mm) in diameter. The body 54 may be an injection molded part. The channels 34 may be difficult to injection mold due to their complex shape. To this end, it may be desirable to secure a portion 52 to the body 54 by thermal or chemical welding, for example. Portions of the channels 34 may be integrally molded with the body 54. In this manner, portions of the channels 34 may be provided by separate molded parts and then assembled into a unitary body 54 to provide the entire channel length. Alternatively, the groove may be machined into the body 54.

A seal 38 is provided in each of the channels 34. In one example, the seal 38 includes a bulb 40 receiving the channel. A stop may be provide at the aft end of each channel 34 to limit the travel of the seal 38 during its insertion into the channel 34. In one example, the bulb 40 has a circular cross-section, although it should be understood that the bulb 40 may have any suitable shape. The bulb 40 is hollow in one example and includes a longitudinally extending hole 42. The hole 42 increase the flexibility of the bulb 40, which enables the seal 38 to more easily be slid into the channel 34 during replacement. The hole 42 receives a pin 46 that prevents the bulb 40 from collapsing during operation. A flexible wall 44 extends outwardly from the bulb 40 away from the body 54.

In one example, the pin 46 and body 54 are fiber reinforced thermoplastic, and the seal 38 is an elastomeric material. In one example, the body 54 may be constructed from a polyetherimide, such as ULTEM, that is carbon and/or glass filled. The pin 46 may be constructed from a nylon material or a polyether ether ketone (PEEK), for example. The seal 38 may be constructed from silicone, for example. In one example, the bulb 40 may have a fabric embedded into its exterior to provide improved durability in scenarios in which the seals rub within the channel 34 and against the fan blade 12.

The pin 46 includes a head 48 that may be provided at one end, for example, the forward end. As illustrated in FIG. 5, the spinner 16 may abut the head 48 subsequent to installation of the nose cone onto the fan hub, preventing the pin 46 from moving in an axial direction and coming unseated from the seal 38.

The disclosed fan blade platform may be more easily repaired in that adhesive need not be used. As a result, the seals 38 may be slid into and out of the platform 24 during repair. In one example, the cap 20 and spinner 16 are removed from the hub 14. The affected platform is removed from the fan hub for access. The pin 46 is slid out of the hole 42 of the seal 38. The seal 38 may be slid or pulled from the channel 34. There is no adhesive that must be removed from the platform, enabling the technician to repair the platform at the engine. A new seal is slid into the channel 34, and the pin 46 is inserted into the hole 42 of the new seal. The platform is reattached to the fan hub. The fan blade 12 includes a surface 50 that deflects the wall 44 radially inward, as shown in FIG. 6. The nose cone is again installed onto the hub 14, which blocks the pin 46.

Although an example embodiment has been disclosed, a worker of ordinary skill in this art would recognize that certain modifications would come within the scope of the claims. For that reason, the following claims should be studied to determine their true scope and content.

What is claimed is:

1. A method of repairing a fan blade platform comprising the steps of:

removing a nose cone to provide access to a fan hub;

detaching the platform from the fan hub;

pulling a removable seal from a groove in the platform;

sliding a new seal in the groove and retaining the new seal therein without adhesive.

2. The method according to claim 1, wherein the removing step includes removing a cap and a spinner.

3. The method according to claim 1, wherein the pulling step includes sliding a pin out of the seal and removing the seal from a channel in the platform.

4. The method according to claim 3, wherein the installing step includes sliding the pin into a longitudinal hole in the new seal.

5. The method according to claim 4, wherein the installing step includes reattaching the nose cone to the fan hub, the nose cone blocking the pin in an axial direction.

* * * * *